United States Patent
Bleck et al.

[19]

[11] Patent Number: 6,151,418
[45] Date of Patent: *Nov. 21, 2000

[54] METHOD FOR IMAGING AN AREA OF INVESTIGATION

[75] Inventors: Joerg-Siegfried Bleck; Michael Gebel, both of Hannover, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/209,633

[22] Filed: Mar. 10, 1994

[30] Foreign Application Priority Data

Dec. 3, 1993 [DE] Germany .............................. 43 07 957

[51] Int. Cl.$^7$ ............................................ G06K 9/40
[52] U.S. Cl. ............................................ 382/274; 382/162
[58] Field of Search .................... 382/54, 6, 162, 382/254, 274, 275, 167; 364/413.22; 348/673, 687, 32, 34; 345/10, 11, 20

[56] References Cited

U.S. PATENT DOCUMENTS

| | | | |
|---|---|---|---|
| 4,789,831 | 12/1988 | Mayo, Jr. | .................................... 348/32 |
| 5,042,077 | 8/1991 | Burke | .................................. 364/413.22 |

FOREIGN PATENT DOCUMENTS 2210533  6/1989  United Kingdom .

OTHER PUBLICATIONS

"Artifact Resistant Grey Scale Windows In Clinical Ultrasound of the Liver," Bleck et al, Book of Abstracts 19th International Symposium on Acoustical Imaging, Apr. 3–5, p. MB3/4–P5, 1991.

"Digital Picture Analysis," Rosenfeld, Ed., pp. 80–83, 1976.

"White Background Control Level Circuit," IBM Technical Disclosure Bulletin, vol. 32, No. 6A, Nov. 1989, pp. 388–390.

*Primary Examiner*—Phuoc Tran
*Attorney, Agent, or Firm*—Hill & Simpson

[57] ABSTRACT

A method for imaging an area of investigation is based on a source half-tone picture of the area of investigation. The source half-tone picture is composed of individual picture elements to which are allocated the source gray scale values corresponding to the morphology of the area of investigation. A framing mask operation produces modified gray scale values from the source gray scale values as a function of a preassigned brightness value and a preassigned contrast value which are fed to a display device. The preassigned contrast value is controlled as a function of the preassigned brightness value or the preassigned brightness value as a function of the preassigned contrast value.

23 Claims, 3 Drawing Sheets

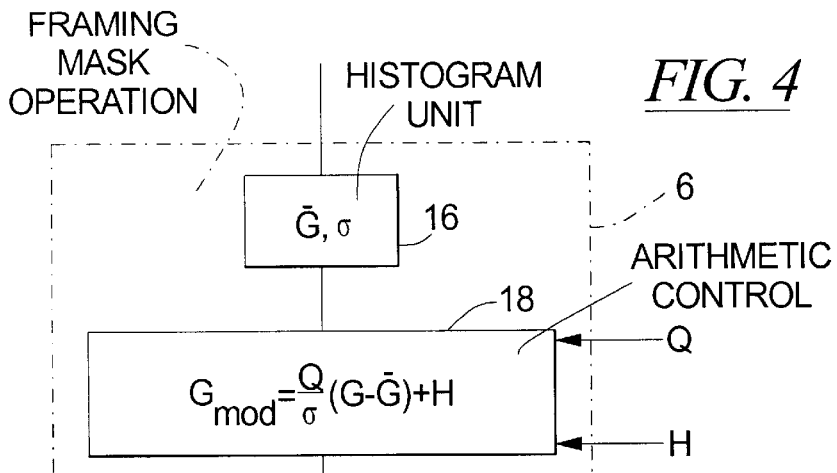
FIG. 4
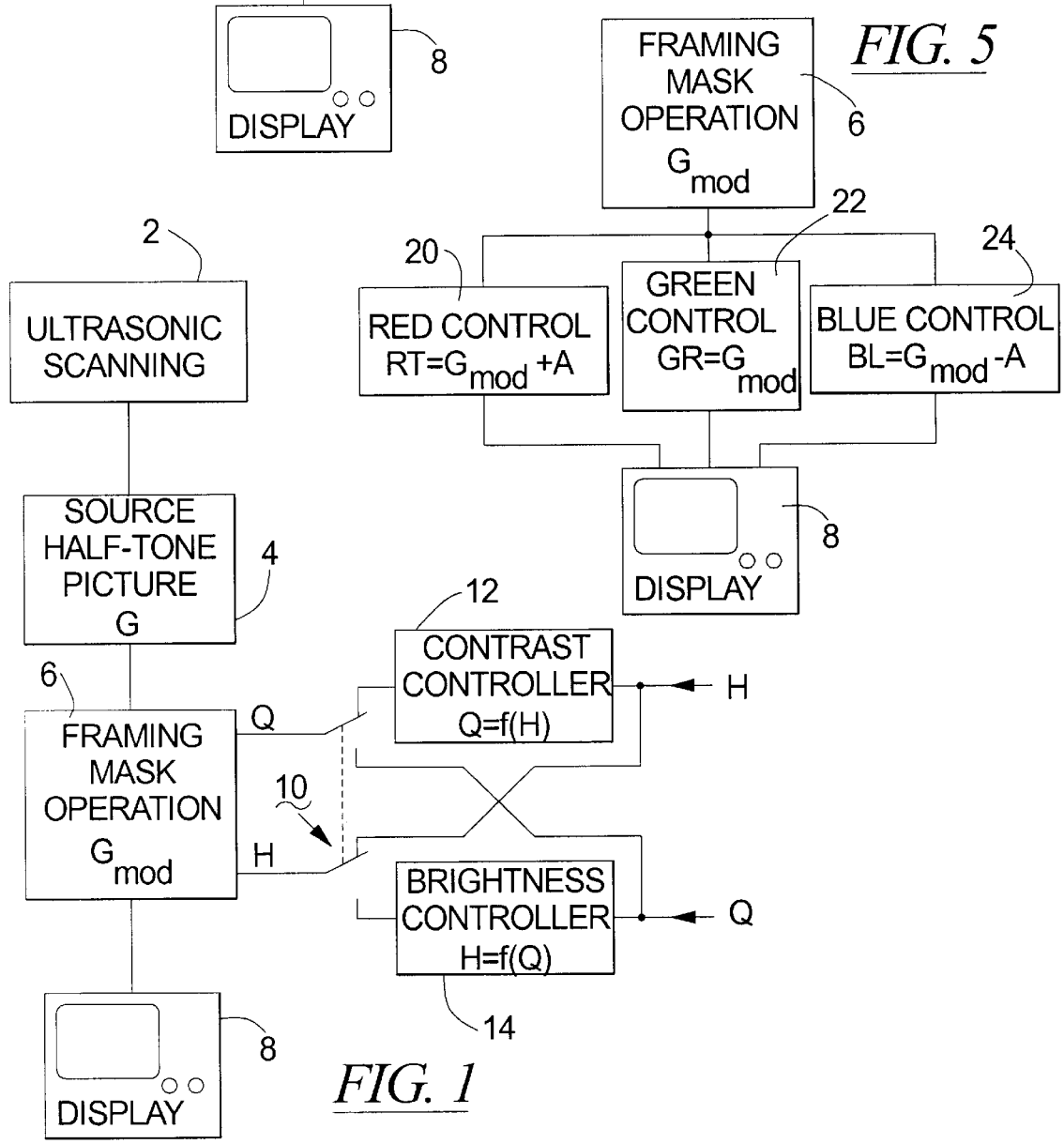
FIG. 5
FIG. 1

METHOD FOR IMAGING AN AREA OF INVESTIGATION

BACKGROUND OF THE INVENTION

1. Field of the Invention

The present invention is directed to a method for imaging an area of investigation by means of a source half-tone picture of the area of investigation, the source half-tone picture being composed of individual picture elements, wherein the picture elements are allocated source gray scale values corresponding to the morphology of the area Of investigation, and employing a framing mask operation which produces modified gray scale values from the source half-tone pictures as a function of a preassigned brightness value and a preassigned contrast value, which are fed to a display device.

2. Description of the Prior Art

Half-tone pictures of an area of investigation are used and evaluated in various fields of medicine and technology. From experience it is known that retinal rods control the monochromatic sensing of light and dark, while retinal cones sense color. The best half-tone differentiation of gray scale values, termed scotopic or rod sight, takes place in a darkened room. Even under optimal conditions, however, only 15 to 40 gray levels can be distinguished. Half-tone pictures, in particular those used in medicine, are typically analyzed in a darkened room.

The adaptation of the human eye to darkness is strenuous, approximately 30 minutes being required before the eye has completely adapted to a dark environment. Interim studies under brightness adaptation conditions either resulted in time delays,.until the eye has adapted completely to a new darkness, or to a reduced half-tone sensing, during which the eye had not completely adapted to darkness.

A brightness adaptation of the half-tone picture to the ambient brightness by modifying the monitor amplification or by amplifying the image-producing system can, however, lead to glare and subthreshold artifacts. A manual tracking of the image contrast cannot prevent image artifacts with absolute certainty. The adaptation of brightness and contrast to ambient conditions is costly and requires considerable experience on the part of the user, A method for improving contrast in the display of an image, using a framing mask operation, is known from the abstract titled, "Artifact-Resistant Gray Scale Windows in Clinical Ultrasound of the Liver" by Bleck et al, published in Book of Abstracts, 19th International Symposium on Acoustical Imaging, Apr. 3–5, 1991, University of the Ruhr, Bochum, Germany. As described therein, various framing mask operations were investigated to determine whether they offer a contrast improvement. This type of solid framing mask operation provides the opportunity to present certain types of tissue more clearly in medical displays. Imaging free from artifacts under any ambient conditions, however, cannot be achieved solely by preassigning a specific mask operation.

Also prone to artifacts is a histogram-oriented framing mask operation, as described by C. A. Harlow et al in Chapter 3.3.2 under the heading Preprocessing" in "Digital Picture Analysis", edited by A. Rosenfeld, Springer-Verlag, Berlin, Heidelberg, New York—1976, pp. 80–83. The histogram comparison cited in this work leads to artifacts in bright and dark image areas.

SUMMARY OF THE INVENTION

It is an object of the present invention to specify a method for optimal presentation of a half-tone picture on a display device under varying ambient conditions. In particular, it is an object that the image processing method converts or modifies the individual gray levels of a source image into images free from artifacts in such a way that a viewer can distinguish the gray levels existing in the source image at the desired ambient brightness, or that the image can be reproduced free from artifacts with maximum contrast.

The above objects are achieved in a method according to the invention wherein the preassigned contrast value is controlled as a function of the preassigned brightness value or the preassigned brightness value is controlled as a function of the preassigned contrast value. By this method, the source half-tone picture can be presented automatically free from artifacts with optimum brightness and/or maximum contrast following the framing mask operation. The modified gray levels are adaptively controlled during the framing mask operation via the histogram of the gray scale value of the source half-tone picture.

In one embodiment the framing mask operation produces the modified gray scale values from the source gray scale values by a linear correlation. With many applications, a linear framing mask operation produces almost no artifacts.

In a further embodiment, from the source gray scale values at least several picture elements produce a brightness average value, a statistical scattering rate is produced by the source gray scale values used for forming the average value, and the framing mask operation produces the modified gray scale values from the source gray scale values as a function of the brightness average value and the scattering rate. A framing mask operation based on the brightness average value and the scattering rate of the source half-tone picture is in most cases adequate for producing an image free from artifacts. Only in rare cases is it necessary to evaluate higher moments of the histogram.

In another embodiment, the framing mask operation, for each picture element, forms a quotient value from the respectively allocated difference value and the scattering value, for each picture element the framing mask operation respectively forms a product value from the quotient value and the preassigned contrast value, and that the framing mask operation forms the modified gray scale value from the sum of the respective product value and the preassigned brightness value. This framing mask operation is suitable, in particular, for adapting medical ultrasounds to the different ambient conditions.

In a further embodiment the red, green, and blue values are formed for each picture element as a function of the modified gray scale values, such that the sum of the red, green, and blue values of the individual picture elements, respectively having the same factor, is proportional to the modified gray scale value, and that the green, red, and blue values of the display device are fed to the display to color the modified half-tone picture. By transforming the gray scale values into color values, the image can be viewed in bright light with a shorter visual reaction time, because the human eye can recognize (differentiate) a greater number of multiple color tones more than readily a presentation of pure gray scale values. The modified half-tone picture is therefore visible both in a polychromatic and in a monochromatic color presentation. It is important that the brightest impression, which is produced by the brightness values of red, green, and blue values, corresponds to the brightness value of the modified half-tone picture.

In a further version of this embodiment the red, green, and blue values, having a similar increase factor, depend on the modified gray scale values. This produces an image in which a viewer frequently can recognize the morphology or, in the case of medical pictures, the anatomy of the area of investigation in a dissolved state.

DESCRIPTION OF THE DRAWINGS

FIG. 1 is a block diagram for explaining the method for optimum reproduction of a half-tone picture according to the invention.

FIG. 4 is a block diagram for a framing mask operation in accordance with the invention.

FIG. 5 is a block diagram for a color coding of the modified half-tone picture in accordance with the invention.

DESCRIPTION OF THE PREFERRED EMBODIMENTS

Figure 2:
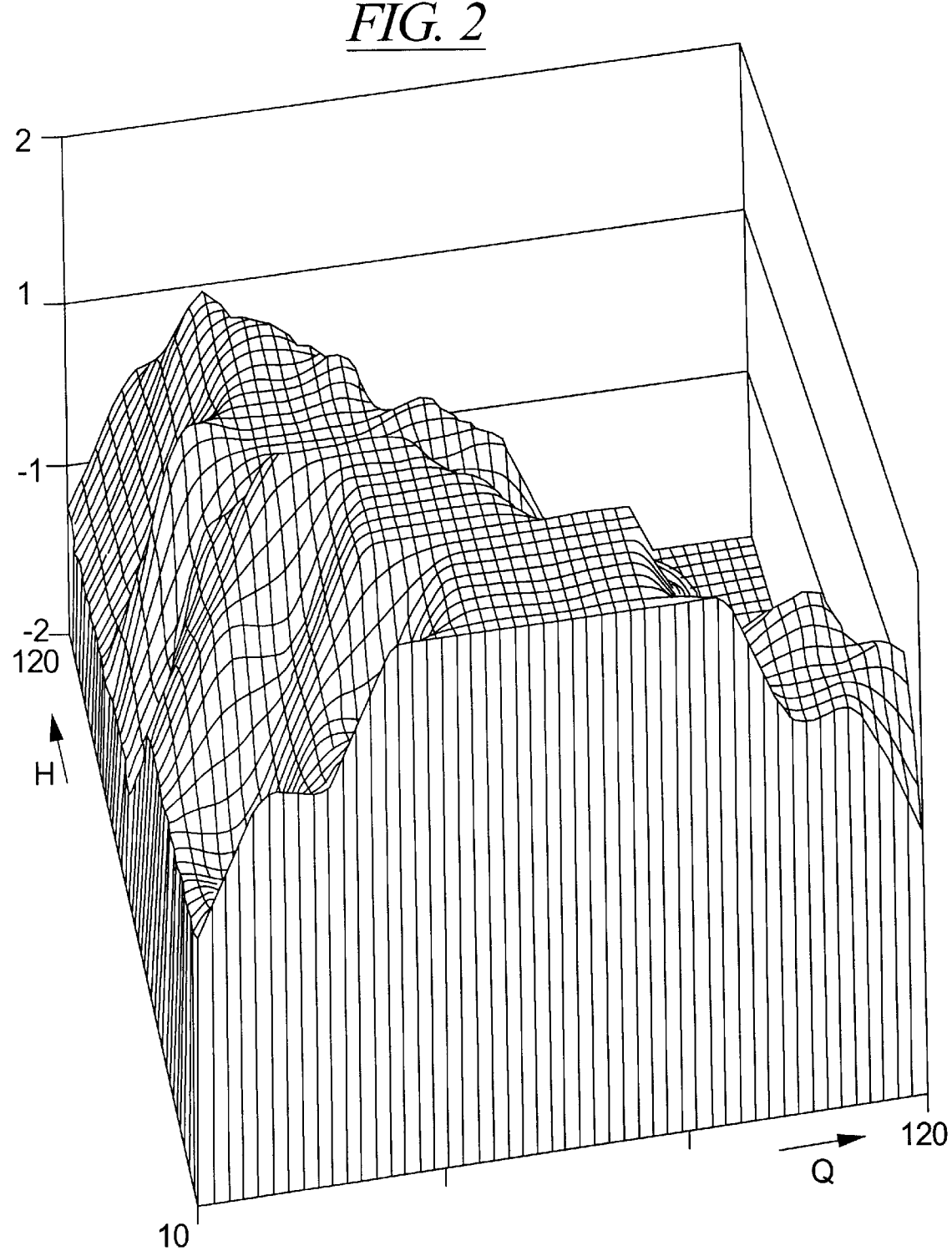
FIG. 2 shows a perspective view of a functional correlation of combinations of the preassigned brightness value and the preassigned contrast value with respect to the quality of the modified half-tone picture.

The method of the invention which is schematically shown in FIG. 1, improves the image of an area of investigation and adapts the displayed image to ambient conditions, without producing image artifacts. The area of investigation can, for example, be part of the human anatomy of which two sectional views have been obtained by conventional ultrasonic scanning 2. A sectional view obtained by the aforesaid means represents a source half-tone picture 4, the gray scale values of which are to be adjusted optimally to the ambient conditions. The source half-tone picture 4 is comprised of individual picture elements. Corresponding to the morphology or anatomy of the area of investigation, source gray scale values G are allocated to the picture elements via the ultrasonic scanning 2. The source half-tone picture 4 is subjected to a framing mask operation 6, which produces modified gray scale values $G_{mod}$ from the source gray scale values G as a function of a preassigned brightness value H and a preassigned contrast value Q, which are fed to a display device B.

In contrast to known framing mask operations, however, only the preassigned brightness value H and the preassigned contrast value Q are adjustable interdependently, so that only combinations of the preassigned contrast value Q and the preassigned brightness value H, which are free from artifacts, can be used for the framing mask operation 6.

Via a reversing switch 10, one can select whether the preassigned brightness value H or the preassigned contrast value Q is adapted directly by the framing mask operation 6. The reversing switch 10 in FIG. 1 is so positioned that the preassigned brightness value is preassigned directly, while the preassigned contrast value Q, as a function of the preassigned brightness value H, is formed only in a contrast controller 12. The contrast controller 12 is designed in the form of a look-up table which, as a function of the preassigned brightness value H, reads out directly from a memory the relevant preassigned contrast value Q and thus provides the framing mask operation E. The brightness value H is adjusted generally as a function of the ambient brightness, while, at the same time, the maximum and optimum contrast are preassigned by the contrast control 12 to provide an image free from artifacts. For example, the preassigned brightness value H can be controlled via a sensor which measures the ambient brightness.

As an alternative, it is possible to preassign the contrast Q, to form, by means of a brightness controller 14, an optimal brightness value with a preassigned contrast value Q, which enables imaging free from artifacts. The design of the brightness controller 14, designed in the form of a look-up table, is similar to the contrast controller 12 which, as a function of the preassigned contrast value Q, directly reads out the preassigned brightness value H which is fed via the reversing switch 10 to the framing mask operation 6.

FIG. 2 shows how combinations of the preassigned contrast value Q and the preassigned brightness value H have an effect on the recognition of the structures of medical half-tone pictures obtained from ultrasonic scanning. This correlation was determined in clinical investigations of the abdomen, while respectively applying the following mask operation shown in FIG. 4 by combining modified preassigned brightness values and contrast values H or Q to the original image obtained from ultrasonic scanning. Experienced investigators then determined the recognition and the improvement or deterioration compared with the original. Overall, in the area between "black" and "white" one starts with 256 different gray scale values, while "black" is represented by the value "zero" and "white" by the value "255". At the same time, the change in contrast was analyzed in terms of semi-quantitative values. The value "−2" means that the contrast and thus the recognition of the gray scale values in the image has deteriorated in contrast to the original image; the value "−1" means that the contrast, compared with the original image, has deteriorated negligibly, the value zero means that the contrast remains unchanged, while positive values indicate improvements of the contrast. The value "+1" means that the contrast has improved slightly and the value "+2" means that the contrast has improved considerably. The results of this investigation were then averaged and form the basis for the look-up tables of the contrast controller 12 and the brightness controller 14.

Figure 3:
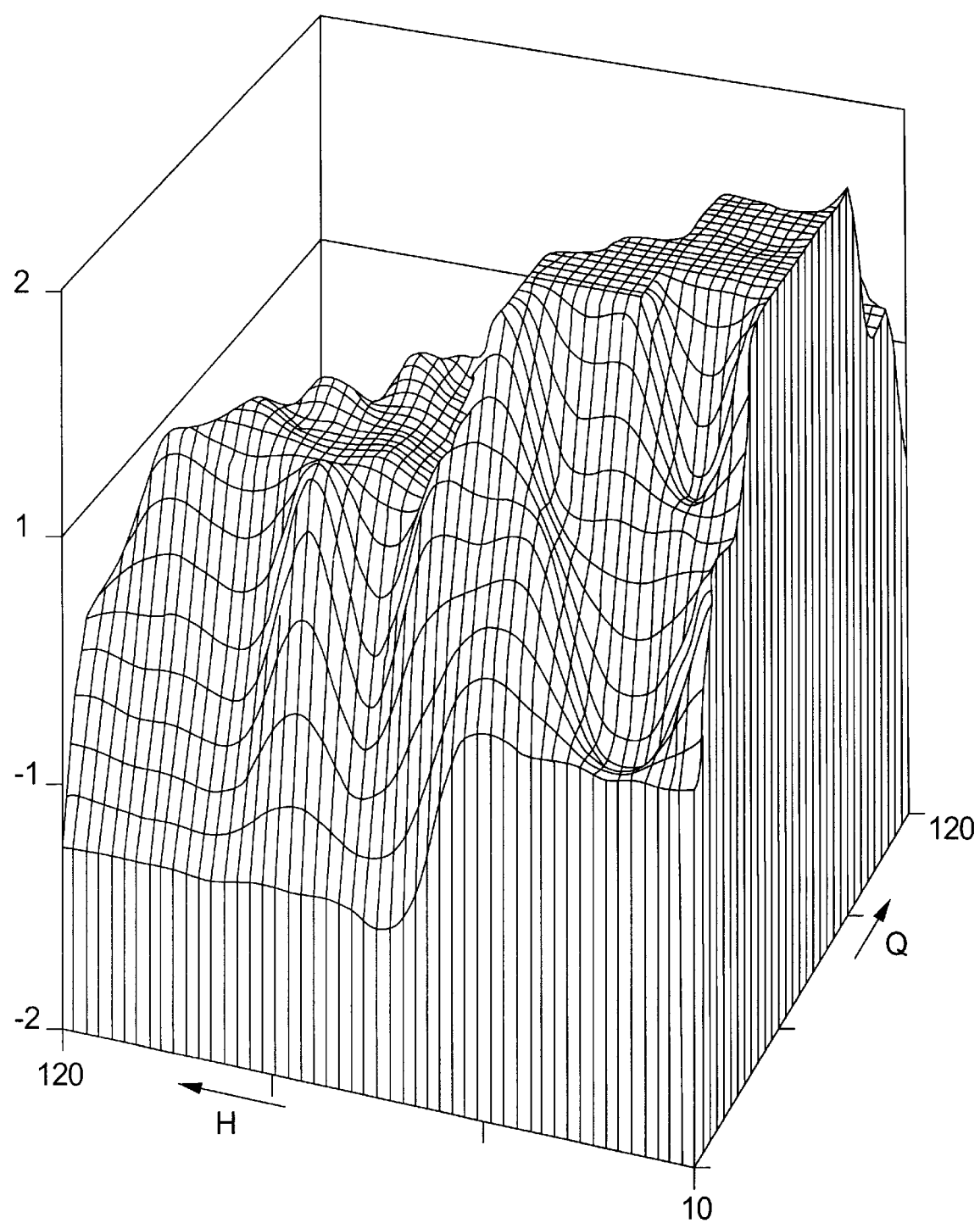
FIG. 3 shows a perspective lateral view of the functional correlation according to FIG. 2.

FIG. 3 shows a similar functional correlation as FIG. 2, but in a lateral perspective. This clearly shows that in a dark surrounding with a corresponding low preassigned brightness value, a maximum recognition Is possible, determined by the value "+2". FIG. 2 and 3 also show the correlation that the contrast-improving range for the preassigned contrast value Q decreases as the preassigned brightness value H increases. For this reason, an independent change of the contrast Q and brightness H must be avoided in any case. Further, from the functional correlation shown in FIG. 2 and 3 one can observe that with a preassigned brightness value of, for example, H=120, a preassigned contrast value Q of approximately 30 offers an improvement in contrast compared with the source half-tone picture, and thus provides better recognition. A lower preassigned brightness value H of 80 and a preassigned contrast value Q of 65 offer an even better contrast.

FIG. 4 shows the structure of the linear framing mask operation 6, which is well-suited for presenting ultrasonic images, In the histogram, unit 16 a brightness average value $\overline{G}$ is formed from at least several picture elements derived from the source gray scale values G. Also formed is the standard deviation σ of the source gray scale values G as a statistical scattering rate, which are used to form the average value. The modified gray scale values $G_{mod}$ are formed in a arithmetic unit 18, which is part of the framing mask operation 6, according to the correlation:

$$G_{mod} = Q/\sigma(G - \overline{G}) + H$$

and then transmitted to the display device 8. Owing to the dependence of the framing mask operation on the original histogram of the source half-tone picture 4, uniform bright pictures with a constant contrast are generated for all picture elements, while maintaining uniform preassigned brightness values and contrast values H or Q independent of the source half-tone picture, thus eliminating the main cause of artifacts. The linearity of the mask prevents a contrast distortion for individual structures.

As shown in FIG. 5, the recognition of the individual structures of the image can be improved during daylight viewing if a pseudo-color presentation is used with a controlled color value for imaging. Here, the color coding of the modified half-tone picture $G_{mod}$ is effected in such a manner that the brightness value of the color image, which is formed by the sum of the red, green, and blue values, RT or GR or BL, corresponds to the gray scale value $G_{mod}$ modified to one factor K:

$$RT+GR+BL=K \cdot G_{mod}.$$

The imaging offers the advantage of a high degree of white in the color image, i.e., a pastel-colored image with low color saturation. In most cases a monochrome image offers a good recognition of structures, so that the red, green, and blue values, RT or GR or BL, can be formed with a similar increase factor S by the modified gray scale values $G_{mod}$.

Thus the modified gray scale values $G_{mod}$, based on the framing mask operation 6, are fed to the color coding of a red control 20, a green control 22, and a blue control 24. The color controls 20, 22, 24 can be realized in a lock-up table or in the form of a arithmetic unit.

The red control 20 offers the red value RT via the correlation:

$$RT=S \cdot G_{mod}+A,$$

the value A representing a measure for the color saturation. A smaller A-value is preassigned by a pastel-colored image. The green control 22 offers the green value via the correlation:

$$GR=S \cdot G_{mod}.$$

The blue control 24 offers the blue value BL via the correlation:

$$BL=S \cdot G_{mod}-A.$$

The factor S may also take the value "one" as is shown in FIG. 4.

The red, green, and blue values, RT, GR, EL, are then fed to a display device 8 which is a color monitor, which feeds a reddish-brown image at low A-values.

It must be emphasized, however, that a pseudo-color presentation Is practical only if, prior to color coding, the brightness is increased in an artifact-resistant framing mask operation.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for displaying an image in a viewing area having viewing conditions, comprising the steps of:

producing a source half-tone image composed of a plurality of individual picture elements;

allocating respective source grayscale values to all of said picture elements for obtaining source grayscale values for an entirety of said source half-tone image;

predetermining a plurality of combinations of brightness values and contrast values which produce an artifact free image and storing said combinations, as stored combinations;

setting a brightness value dependent on said viewing conditions, as a set brightness value, and conducting a framing mask operation on each of said source grayscale values for producing modified grayscale values from each of said source grayscale values using only said set brightness value and said stored combinations; and feeding said modified grayscale values to a display device for displaying an artifact-free modified grayscale value image corresponding to said source half-tone image.

2. A method as claimed in claim 1 wherein the step of conducting a framing mask operation is further defined by conducting a framing mask operation for producing said modified gray scale values by a linear correlation with said source gray scale values.

3. A method as claimed in claim 2 comprising the additional steps of:

forming a brightness average value from the source gray scale values for a plurality of said picture elements;

determining a degree of statistical scatter of said source gray scale values used for forming said average value; and conducting said framing mask operation for producing said modified gray scale values from said source gray values as a function of said brightness average value and said degree of statistical scatter.

4. A method as claimed in claim 3 wherein said plurality of picture elements comprises all of said picture elements.

5. A method as claimed in claim 3 wherein said degree of statistical scatter comprises the standard deviation of said source gray scale values.

6. A method as claimed in claim 3 comprising the additional steps of:

for each picture element, forming in said framing mask operation a difference value from the source gray scale value for a picture element and said brightness average value;

for each picture element, forming in said framing mask operation a quotient value from said difference value and said degree of statistical scatter;

forming in said framing mask operation a product value from said quotient value and said contrast value; and conducting said framing mask operation to form said modified gray scale value for each picture element from the sum of said product value and said preassigned brightness value.

7. A method as claimed in claim 6 wherein said plurality of picture elements comprises all of said picture elements.

8. A method as claimed in claim 6 wherein said degree of statistical scatter comprises the standard deviation of said source gray scale values.

9. A method as claimed in claim 1 comprising the additional steps of:

forming red, green and blue values for each picture element dependent on said modified gray scale values;

proportioning a sum of the red value, the green value and the blue value for each picture element relative to said modified gray scale value by an identical factor; and supplying said red, green and blue values to said display device for colored display of said modified gray scale value image.

10. A method as claimed in claim 9 wherein the step of proportioning said red value, said green value and said blue value for each picture element relative to said modified gray scale value is further defined by linearly proportioning said red value, said green value and said blue value for each picture element relative to said modified gray scale value for that picture element.

11. A method as claimed in claim 10 wherein the step of linearly proportioning said red value, said green value and said blue value of each of said picture elements is further defined by linearly proportioning said red value, said green value and said blue value for each picture element relative to said modified gray scale value for that picture element using an identical slope.

12. A method as claimed in claim 1 comprising obtaining said set brightness value from a brightness sensor disposed within said viewing conditions.

13. A method for displaying an image in a viewing area having viewing conditions, comprising the steps of:

producing a source half-tone image composed of a plurality of individual picture elements;

allocating respective source grayscale values to all of said picture elements for obtaining source grayscale values for an entirety of said source half-tone image;

predetermining a plurality of combinations of brightness values and contrast values which produce an artifact free image and storing said combinations, as stored combinations;

setting a contrast value dependent on said viewing conditions, as a set contrast value, and conducting a framing mask operation on each of said source grayscale values for producing modified grayscale values from each of said source grayscale values using only said set contrast value and said stored combinations; and feeding said modified grayscale values to a display device for displaying an artifact-free modified grayscale value image corresponding to said source half-tone image.

14. A method as claimed in claim 13 wherein the step of conducting a framing mask operation is further defined by conducting a framing mask operation for producing said modified gray scale values by a linear correlation with said source gray scale values.

15. A method as claimed in claim 14 comprising the additional steps of:

forming a brightness average value from the source gray scale values for a plurality of said picture elements;

determining a degree of statistical scatter of said source gray scale values used for forming said average value; and conducting said framing mask operation for producing said modified gray scale values from said source gray values as a function of said brightness average value and said degree of statistical scatter.

16. A method as claimed in claim 15 wherein said plurality of picture elements comprises all of said picture elements.

17. A method as claimed in claim 16 wherein said degree of statistical scatter comprises the standard deviation of said source gray scale values.

18. A method as claimed in claim 16 comprising the additional steps of:

for each picture element, forming in said framing mask operation a difference value from the source gray scale value for a picture element and said brightness average value;

for each picture element, forming in said framing mask operation a quotient value from said difference value and said degree of statistical scatter;

forming in said framing mask operation a product value from said quotient value and said preassigned contrast value; and conducting said framing mask operation to form said modified gray scale value for each picture element from the sum of said product value and said brightness value.

19. A method as claimed in claim 18 wherein said plurality of picture elements comprises all of said picture elements.

20. A method as claimed in claim 18 wherein said degree of statistical scatter comprises the standard deviation of said source gray scale values.

21. A method as claimed in claim 13 comprising the additional steps of:

forming red, green and blue values for each picture element dependent on said modified gray scale values;

proportioning a sum of the red value, the green value and the blue value for each picture element relative to said modified gray scale values by an identical factor; and supplying said red, green and blue values to said display device for color display of said modified gray scale value image.

22. A method as claimed in claim 21 wherein the step of proportioning said red value, said green value and said blue value for each picture element relative to said modified gray scale value is further defined by linearly proportioning said red value, said green value and said blue value for each picture element relative to said modified gray scale value for that picture element.

23. A method as claimed in claim 22 wherein the step of linearly proportioning said red value, said green value and said blue value of each of said picture elements is further defined by linearly proportioning said red value, said green value and said blue value for each picture element relative to said modified gray scale value for that picture element using an identical slope.

* * * * *